United States Patent

[11] 3,617,629

| [72] | Inventor | Brian Dennis McCarthy<br>Richmond, England |
|------|----------|------------------------------------|
| [21] | Appl. No. | 790,373 |
| [22] | Filed | Jan. 10, 1969 |
| [45] | Patented | Nov. 2, 1971 |
| [73] | Assignee | National Research Development Corporation<br>London, England |
| [32] | Priority | Jan. 17, 1968 |
| [33] | | Great Britain |
| [31] | | 2649/68 |

[54] PATTERN DETECTION APPARATUS
3 Claims, 6 Drawing Figs.

[52] U.S. Cl. ............................................ 178/6.8,
250/202, 315/10, 315/19, 315/24
[51] Int. Cl. ............................................. H04n 3/00
[50] Field of Search ............................................. 315/19, 24,
10; 250/202; 178/6.8

[56]  References Cited
UNITED STATES PATENTS

| 2,274,366 | 2/1942 | Hansen | 315/24 |
| 2,402,168 | 6/1946 | Lifschutz | 315/24 |
| 2,974,254 | 3/1961 | Fitzmaurice | 250/202 X |
| 3,050,581 | 9/1962 | Bomba | 250/202 X |
| 3,229,100 | 1/1966 | Grenias | 250/202 |
| 3,333,144 | 7/1967 | Bulk | 315/10 |
| 3,429,989 | 2/1969 | Stockdale | 178/6.8 |
| 3,429,990 | 2/1969 | Hobrough | 315/19 |

Primary Examiner—Malcolm F. Hubler
Assistant Examiner—Joseph G. Baxter
Attorney—Cushman, Darby & Cushman ABSTRACT: In apparatus for detecting cervical smears on microscope slides, an image of the field is scanned with a television-type scan and a detector detects any light changes caused when the scan crosses the boundary of a distinctive area. On the detection of such an area the apparatus switches to a tracing mode which traces around the area with a step-by-step motion in a series of small orthogonal steps and the coordinates of the stepping points are stored. Eventually the scan returns to its original starting point after which the television pattern scan continues until the next area is detected.

INITIAL SCAN DIRECTIONS

→ X
↓ Y

X+ →
X- ←
Y+ ↓
Y- ↑

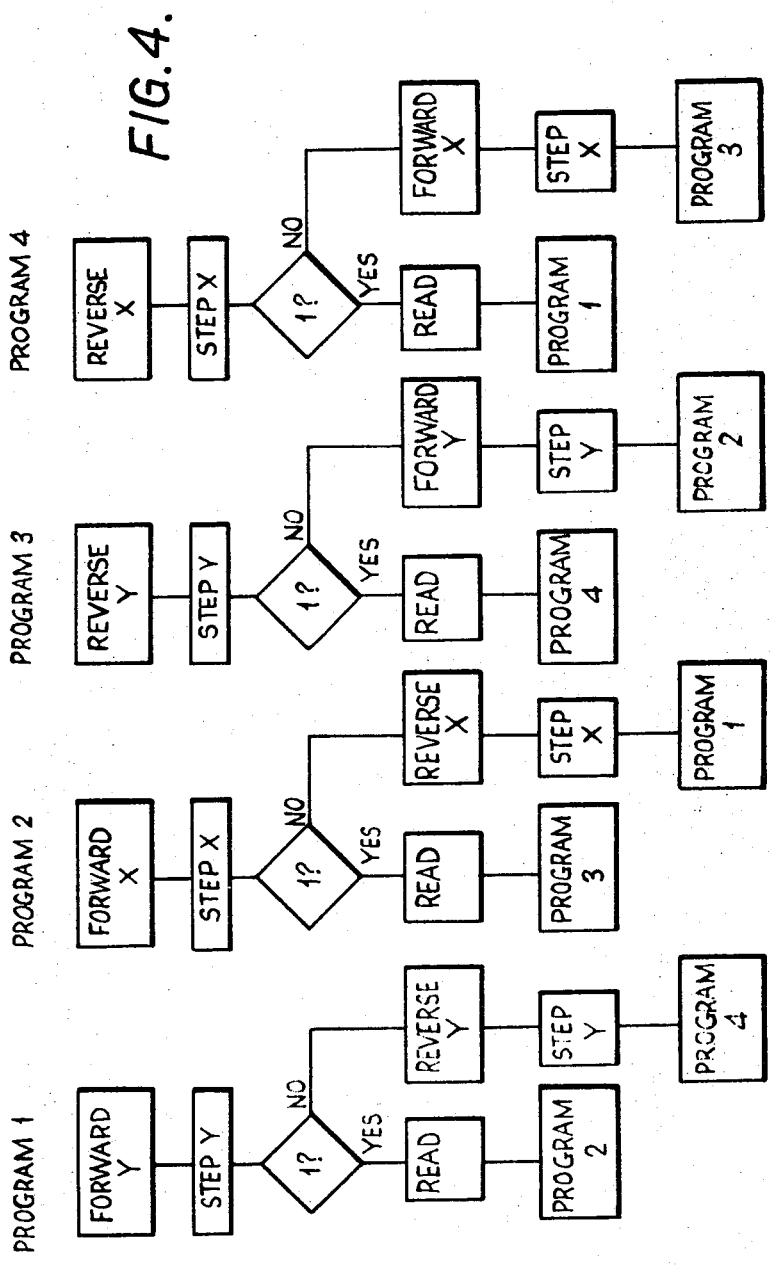

PATTERN DETECTION APPARATUS

This invention relates to pattern detection apparatus. It has application in the detection and classification of biological specimens provided as prepared microscope slides, for example cervical smears.

According to the present invention pattern detection apparatus comprises means for causing a light beam to scan a field in a raster of lines, means for detecting changes in the light response from the field produced when the beam crosses the boundary of a distinctive area in the field, means for deflecting the beam in small steps alternately in two orthogonal directions under the control of the detection means so as to cause the beam to trace round the boundary of the area, and means for storing the values of the coordinates of the beam in the field when tracing round the boundary.

The scanning means preferably comprises a clock pulse generator, a first divider circuit for providing a line scan and a second divider circuit connected to receive the output of the first divider circuit for providing the frame scan. Gating means may be included to gate the pulse train from the pulse generator to the first divider circuit and inhibit the train when the boundary of an area has been detected. Thereafter the deflection means operates to deflect the beam back one small step along the line and the coordinates of the position to which the beam has stepped back are stored.

In order that the invention may be more fully understood reference will now be made to the accompanying drawings in which FIG. 1 illustrates in block diagrammatic form apparatus embodying the invention;

FIG. 4 illustrates diagrammatically a program for tracing out the boundary of an area.

Figure 1:
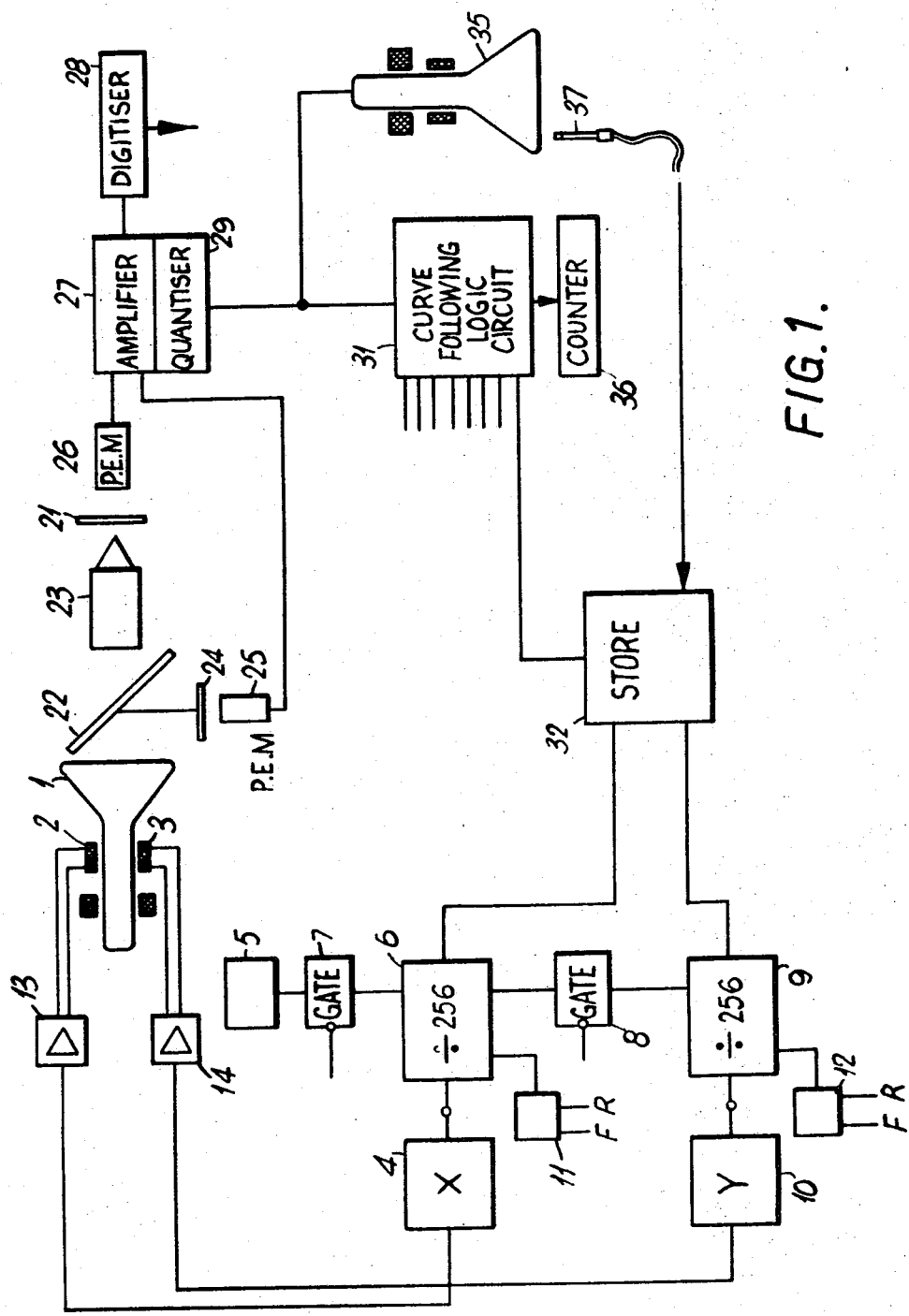
Figure 2A:
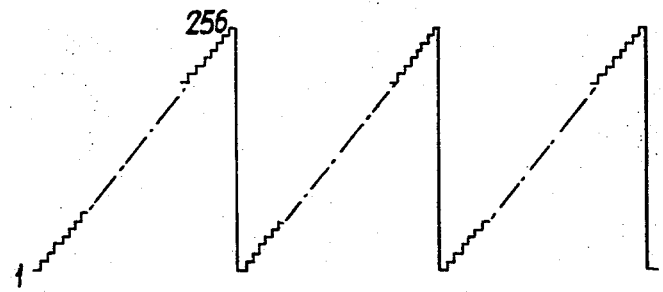
FIGS. 2a and 2b are waveforms of the line and frame scan of the beam.
Figure 2B:
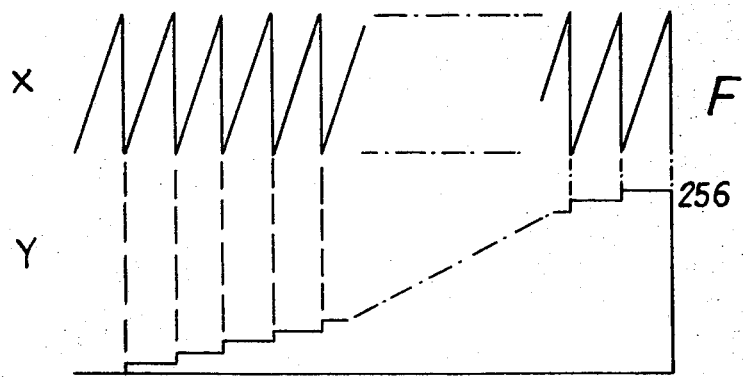

Pattern detection apparatus embodying the invention is illustrated in FIG. 1. The apparatus includes a cathode-ray tube 1 the beam of which is deflected in two orthogonal directions (the X-direction and the Y-direction) by means of deflecting coils 2 and 3. The deflecting coils are driven to produce a television-type raster of a series of lines extending in the X-direction successive lines being displaced in the Y-direction to constitute a frame. The line scan is produced by a line scanner 4 the output of which is applied to an amplifier 13. Scanner 4 is driven from a clock pulse generator 5 and divider circuit 6. A gate 7 is interposed between pulse generator 5 and divider circuit 6. Divider circuit 6 consists of eight scale-of-two dividers and hence produces an output which is a scaled-down version of the clock pulse train by a factor of 256. The resultant output of the scanner 4 is a staircase waveform shown in FIG. 2a which consists of 256 steps. The output of divider circuit 6 is also taken through a gate 8 to a further divider circuit 9 which is similar to circuit 6 and which drives the frame scanner 10 the output of which is applied to amplifier 14 and thence to deflection coil 3. With both gate 7 and gate 8 open, this cascaded arrangement causes the frame divider circuit 9 to increment one pulse for every 256 X-pulses. The time relationship between the line and frame scan drives are thus as shown in FIG. 2b in which both the X-scan and the Y-scan are shown to the same time scale. Dividers 6 and 9 are of the reversible type and may operate either forward or reverse under the control of pulses applied to either the F- or R-terminals of control circuits 11 and 12. Connections are also provided to dividers 6 and 9 to allow single pulses to be applied so that when gates 7 and 8 are closed the beam can be stepped in either the X-direction or the Y-direction independently by a single small step corresponding to one step of the staircase waveform in FIG. 2a or 2b. This feature coupled with the fact that each chain can count up or down allows the beam of tube 1 to be deflected in any direction within the bounds of the raster.

The raster generated on the face of scan tube 1 is imaged on to a slide 21 which carries the specimen to be examined by way of a semireflecting mirror 22 which transmits about 90 percent of the incident light and microscope 23. The light transmitted through slide 21 is detected by a photomultiplier 26 the output of which is amplified in a video amplifier 27 and applied to a level slicing or quantizing circuit 29 which provides an output which is either "0" when the incident light is below a preset density level or "1" when it is above this threshold. The unquantized or analogue video signal is also fed to a digitizer 28 which converts the instantaneous values of the level of the video signal into digitally coded words which may be recorded on paper tape or other suitable recording medium. A monitor tube 35 is provided the intensity of the beam of which is controlled by quantizer 29 and the deflection of the beam is controlled by scan amplifiers 13 and 14.

In order to compensate for the effect of the microscope optics on the light intensity which reduces the intensity by a factor of $\cos^4\theta$ the 10 percent of the light reflected by semireflecting mirror 22 is directed through a filter 24 on to a reference photomultiplier 25 the output of which controls the amplification of video amplifier 27. Filter 24 is produced by exposing a photographic plate positioned above the microscope eyepiece with a clear glass slide in place of the test slide. The light source is imaged on the plate by way of the condenser in the normal fashion. The filter so produced embodies the $\cos^4\theta$ fall-off in light intensity due to the microscope optics and allows the video amplifier 27 to be compensated for this. The reference photomultiplier 25 also reduces the effect of noise in the signal due to screen granularity, dust particles and general nonuniformity of the scan tube phosphor. Each filter will only be suitable for a given eyepiece and objective so that different filters will be needed for different magnifications.

Figure 3:
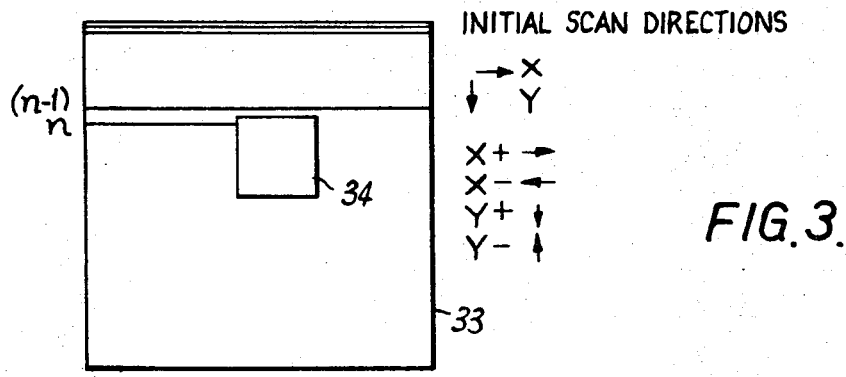
FIG. 3 is illustrative of the detection of an area in the field being scanned.

To detect the shape of a distinctive area in the field being examined, which in the apparatus illustrated in FIG. 1 will be a distinctive area on slide 21, a curve-following logic circuit 31 is provided together with a digital store 32. FIG. 3 shows an example of a field 33 being scanned in which there is a distinctive area 34. The output from the quantizer 29 from the commencement of the scan up to and including the line $n-1$ will be 1, but in the line $n$ the quantizer output will fall to "0" when the beam first encounters the boundary of the area 34. The "0" signal from quantizer 29 is used to close gates 7 and 8 and stop the scan. Circuit 31 then initiates the following series of events.

i. A pulse is applied to the R-terminal of circuit 11 to put divider 6 into its reverse mode, ii. a single pulse is fed to divider 6 to cause the beam to step back one step along the line of magnitude equal to the steps of the line scan shown in FIG. 2a, 111. the values of the then present X- and Y-deflections are stored in digital form in store 32.

The value of the coordinates now stored in store 32 constitute the first point in the boundary of area 34 and thereafter the curve-following logic circuit 31 controls the stepping of the cathode-ray tube beam in the manner programmed in FIG. 4 to cause the beam to trace around the boundary of area 34. The curve-following logic commences with the selection of program quantizer and thereafter continues in the manner set out in FIG. 4. The legends 'FORWARD' and the 'REVERSE' mean that pulses are applied to either the F- or the R-terminals of circuit 11 or 12 depending on X or Y is selected. The legend 'STEP' means that a single pulse is applied to the divider circuits 6 or 9 depending on whether 'STEP X' or 'STEP Y' is required. The decision-making parts of the programs operate to select either the first or the second branch of each program depending on whether or not a "1" output is present at quantizer 29, and the legend 'READ' means that the values of the coordinates of the beam then present in the divider circuits 6 and 9 are read into store 32. The program set out in FIG. 4 is continued until the store once again repeats the value of the initial coordinates stored therein thus showing that the beam has traced around a complete closed loop. Thereafter the curve-following logic is switched off, gates 7 and 8 are opened and the beam is deflected under the control of the normal scanning mode. For ill-defined boundaries a light pen 37 is provided in conjunction with monitor tube 35. The pen is used to trace out the likely boundary where this is not clear, and the coordinates of the pen positions are directly fed to store 32.

The arrangement thus far described provides for the detection of a single area only. In general there will be several distinctive areas of the kind shown in FIG. 3 in a particular field and it is desirable to include some form of anticoincidence detection. One arrangement for providing this is to construct store 32 so that it has 1 bit for each coordinate of the field. Where the line and frame scans each have 256 steps then the number of bits in store 32 will be 65,536. At the commencement of the scan all the bits in the store have a "0" written in. The store is scanned in synchronism with the stepping of the X- and Y-divider circuits and whenever a read instruction is obtained from the curve-following logic circuit 31 a "1" is inserted in the store. Thus on the completion of the following of a boundary of a curve there will be a series of "1's" in the store at positions corresponding to the periphery of the area. If an area is encountered which already has the coordinates of its boundary written into the store then the "1" present at the bit in the store then being scanned will inhibit the curve-following logic circuit 31 and cause the beam to continue in its normal scanning mode until it causes a "1" to be written into the store at a position which hitherto carries a "0". This further "1" signal re-enables logic circuit 31 again to cause it to scan around a fresh area.

It may be desirable to ignore areas which lie on the edge of the field.

In practice noise may be present in the output of quantizer 29 which may cause the initiation of a curve-following program. The effect of such noise will be to cause the beam to trace around a closed loop of 4 coordinate points and thereafter continue in its normal scanning mode. It is readily possible to provide that such 4-element areas are disregarded.

It will often be the case that the areas being detected do not have constant densities and two or more areas may overlap. By adjusting the level at which quantizer 29 switches from "0" to "1" various isodensity curves can be followed so that overlapping areas can be separately detected.

In addition to detecting the presence of areas the apparatus described herein may provide a number of additional items of information. Thus the total number of areas counted may be readily ascertained by attaching a counter 36 to circuit 31 to count the number of times that the curve-following mode is initiated. This will give the total number of distinctive areas present.

Figure 5:
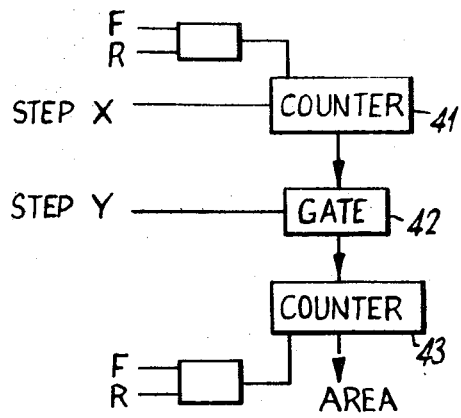
FIG. 5 illustrates an arrangement for calculating the sizes of areas in the field.

It is also possible to compute the size of each area by means of the calculator illustrated in FIG. 5. This calculator comprises a reversible counter 41 the direction of counting of which is controlled from a control circuit 44. Counter 41 feeds its count through a gate 42 to a further reversible counter 43 which is controlled from gate circuit 45. Information to the calculator is fed from circuit 31 and comprises the 'FORWARD' and 'REVERSE' signals and the 'STEP' signals from the program shown in FIG. 4. Each time a 'STEP X' instruction is given a single counting pulse is fed to counter 41 which adds or subtracts a unit digit from the count standing in counter 41 depending on whether 'FORWARD X' or 'REVERSE X' has been selected and applied to circuit 44. The initial count in counter 41 at the commencement of the curve trace is set at "0". Whenever a 'STEP Y' function is called for, it is used to open gate 42 and apply the count then standing in counter 41 to counter 43. The count thus fed to counter 43 is either added or subtracted to the count already standing in counter 43 depending on whether 'REVERSE Y' or 'FORWARD Y' has been selected (It should be noted that the sign convention for Y is reversed compared with program 4.) The resultant count finally standing in counter 43 when the complete area has been traced around is a measure of the size of the area.

The coordinates of the center of gravity of an area can be computed by taking the average value of all the X-coordinates and Y-coordinates of an area. From this the length of the radius vector from the center of gravity as origin to all the points around the periphery can be calculated. This will produce a function which is similar for different areas of similar shape despite different orientations of the areas. The only affect of the different orientations will be to produce a phase shift of the function.

The autocorrelation function of this curve can then be calculated to give information on the degree of regularity of the periphery of the area.

I claim:

1. Pattern detection apparatus comprising: means for causing a light beam to scan a field in a raster of lines,
    means for detecting changes in a light response from said field produced when said beam crosses a boundary of a distinctive area in the field,
    means for deflecting said beam in small steps alternately in two orthogonal directions in response to said means for detecting and for causing said beam to thereby trace around said boundary of the area, said deflecting means being actuated each time said means for detecting detects a change in light response from said field,
    storage means for storing coordinate valves of the said deflection means,
    said means for deflecting being constructed to respond to said detection means for deflecting said beam back one small step upon detecting said change in light response, and
    said storage means being constructed to store coordinates of the position to which said beam has been stepped back.

2. Apparatus as claimed in claim 1 in which the scanning means comprises a clock pulse generator, a first divider circuit for providing a line scan and a second divider circuit connected to receive the output of the first divider circuit for providing the frame scan.

3. Apparatus as claimed in claim 2 in which gating means are included to gate the pulse train from the pulse generator to the first divider circuit which gating means is closed by the detection means when the boundary of an area has been detected.

* * * * *